United States Patent
Chichester-Constable

(10) Patent No.: US 10,863,663 B2
(45) Date of Patent: Dec. 15, 2020

(54) AERATOR DEVICE

(71) Applicant: Kevin Chichester-Constable, Spring City, PA (US)

(72) Inventor: Kevin Chichester-Constable, Spring City, PA (US)

(*) Notice: Subject to any disclaimer, the term of this patent is extended or adjusted under 35 U.S.C. 154(b) by 235 days.

(21) Appl. No.: 15/884,024

(22) Filed: Jan. 30, 2018

(65) Prior Publication Data

US 2018/0213711 A1 Aug. 2, 2018

Related U.S. Application Data

(60) Provisional application No. 62/452,526, filed on Jan. 31, 2017.

(51) Int. Cl.
| | | |
|---|---|---|
| *A01B 45/02* | (2006.01) | |
| *A01C 23/04* | (2006.01) | |
| *A01C 23/02* | (2006.01) | |
| *A01B 1/24* | (2006.01) | |
| *A01C 5/04* | (2006.01) | |

(52) U.S. Cl.
CPC .............. *A01B 45/02* (2013.01); *A01B 1/243* (2013.01); *A01C 23/026* (2013.01); *A01C 23/04* (2013.01); *A01C 5/04* (2013.01); *A01C 23/028* (2013.01)

(58) Field of Classification Search
CPC ......... A01B 45/00; A01B 45/02; A01B 1/243; A01C 23/026; A01C 23/028; A01C 23/04; A01C 23/047; A01C 5/04
See application file for complete search history.

(56) References Cited

U.S. PATENT DOCUMENTS

| | | | | |
|---|---|---|---|---|
| 2,930,334 A | * | 3/1960 | Marron | A01M 17/002 111/127 |
| 3,998,387 A | * | 12/1976 | Maasberg | B08B 3/024 239/102.1 |
| 4,186,879 A | * | 2/1980 | Kinder | A01M 7/0064 172/248 |
| 4,233,915 A | * | 11/1980 | Kordon | A01B 33/142 111/128 |
| 4,624,193 A | * | 11/1986 | Johnston | A01M 17/002 111/127 |
| 4,705,218 A | | 11/1987 | Daniels | |
| 4,782,551 A | * | 11/1988 | Ballwebber | A47L 11/34 15/321 |

(Continued)

*Primary Examiner* — Jessica H Lutz
(74) *Attorney, Agent, or Firm* — Boudwin Intellectual Property; Daniel Boudwin

(57) ABSTRACT

The aerator device includes a manifold including an interior channel, a connector aperture, and a plurality of nozzles configured to discharge a pressurized fluid stream. A cover plate is disposed on an upper side of the manifold. A first connector includes a first open end in fluid communication with the interior channel and a second end extending through a connector aperture disposed on an upper side of the cover plate. A second connector is configured to receive a hose connection to a pressurized fluid supply. A wheel including a wheel height adjustment mechanism is affixed to each side portion of the cover plate. In one embodiment, the manifold is configured to rotate when the wheels of the device rotate via a drive roller. A handle extending rearwardly from the cover plate includes a trigger mechanism configured to activate the flow of fluid from a pressurized fluid source.

12 Claims, 4 Drawing Sheets

(56) References Cited

U.S. PATENT DOCUMENTS

| | | | | |
|---|---|---|---|---|
| 5,291,842 | A * | 3/1994 | Sallstrom | A01C 23/026 111/127 |
| 5,586,604 | A * | 12/1996 | Postema | A01B 45/02 172/21 |
| 5,927,601 | A * | 7/1999 | Newson | A01M 7/00 239/1 |
| 5,983,559 | A * | 11/1999 | Manabe | A01B 45/00 111/127 |
| 6,269,757 | B1 * | 8/2001 | Kiest | A01C 23/024 111/119 |
| 6,431,096 | B1 * | 8/2002 | Engelke | A01C 7/008 111/127 |
| 7,063,281 | B2 * | 6/2006 | Schommer | B05B 7/0884 239/428.5 |
| 7,896,266 | B1 * | 3/2011 | Cooper | B05B 9/007 239/754 |
| 10,420,333 | B2 * | 9/2019 | Mellin | A01C 23/047 |
| 2007/0289511 | A1 * | 12/2007 | Chen | A01B 33/16 111/92 |
| 2009/0173508 | A1 * | 7/2009 | Langworthy | A01B 45/023 172/21 |
| 2011/0203161 | A1 | 8/2011 | Cink et al. | |

* cited by examiner

US 10,863,663 B2

AERATOR DEVICE

CROSS REFERENCE TO RELATED APPLICATIONS

This application claims the benefit of U.S. Provisional Application No. 62/452,526 filed on Jan. 31, 2017. The above identified patent application is herein incorporated by reference in its entirety to provide continuity of disclosure.

BACKGROUND OF THE INVENTION

The present invention relates to aerating devices. More specifically, the present invention provides an aerator device that connects to a pressurized fluid source for boring holes in a ground surface.

Ground surfaces such as yards, gardens, and the like are often aerated for a variety of reasons. Aeration is the process of mixing air with another substance, in this case soil. An aerator typically accomplishes this by pushing or boring a hole into the soil, allowing air to flow down into the hole and saturate the soil with oxygen, nitrogen, and other elements. The aeration holes are typically made in linear patterns across the entirety of a lawn or other surface to be aerated, because a greater number of aeration holes increases the amount of air that is able to mix with the soil.

Typical powered aerators utilize multiple hollow tines that are driven into the ground via forward movement of the aerator device. The tines bore into the soil, creating a hole in the soil filled by a soil core. The aerator usually has a mechanism for removing the soil core, leaving behind an open aeration hole. However, these powered core aeration systems have several drawbacks. These machines are typically very heavy and difficult to maneuver. They are also prohibitively expensive, meaning many individuals must rent the machine or hire a professional service to perform the aeration. Further, these types of machines cannot cross over sidewalks or tree roots due to the damage it would cause. These machines can also accidentally clip hidden electrical wires or pipes, potentially causing costly damage.

Another drawback to coring-type aerator devices is that they typically leave behind many, many soil cores which can cause an unsightly appearance. After repeated use, soil can become lodged in the tines, and must be removed in order for the aerator to function properly. This can be a time-consuming and frustrating process. Further, these types of aerators are suited only to digging aeration holes. They lack a means for introducing water, fertilizer, or other components to the aeration hole, such that the hole may be utilized for planting bulbs, flowers, trees, shrubs, and any other type of plant. In view of the above, it is desirable to provide an aerator device that is configured to bore aeration holes via a pressurized fluid stream, such that a pre-watered hole is created in which a plant may be planted.

In light of the devices disclosed in the known art, it is submitted that the present invention substantially diverges in design elements from the known art and consequently it is clear that there is a need in the art for an improvement to existing aerator devices. In this regard the present invention substantially fulfills these needs.

SUMMARY OF THE INVENTION

In view of the foregoing disadvantages inherent in the known types of aerator devices now present in the prior art, the present invention provides an aerator device wherein the same can be utilized for providing convenience for the user when boring aeration holes in a ground surface. The present aerator device comprises a manifold including an interior channel, a connector aperture, and a plurality of nozzle apertures. A cover plate is disposed on an upper side of the manifold. A first connector includes a first open end in fluid communication with the interior channel of the manifold and a second end extending through a connector aperture disposed on an upper side of the cover plate. A second connector includes a first end affixed to the second end of the first connector and a second end configured to receive a hose connection to a pressurized fluid supply. A nozzle is connected to each nozzle aperture, and each nozzle is configured to discharge a pressurized stream of fluid. A wheel height adjustment mechanism is affixed to a side portion of the cover plate, the wheel height adjustment mechanism including a frame with a plurality of teeth, a lever plate pivotally connected to the frame, and a wheel rotatably connected to the lever plate, wherein the lever plate is configured to adjust the height of the wheel with respect to a ground surface. The first connector, second connector, manifold interior channel, and plurality of nozzles are in fluid communication with each other. A handle extending rearwardly from cover plate includes a trigger mechanism configured to activate a flow of fluid from a pressurized fluid supply. The aerator device can be utilized to bore aeration holes in a ground surface via discharge of pressurized fluid. Further, the aeration holes can be used as a pre-watered hole for planting bulbs, shrubs, trees, and other types of plants.

One object of the present invention is to provide an aerator device that includes all of the advantages of aerator devices in the known art but none of the disadvantages.

Another object of the present invention is to provide an aerator device that includes a manifold configured to rotate when the wheels rotate, allowing for the creation of staggered or alternating rows of aeration holes.

A further object of the present invention is to provide an aerator device that includes nozzles configured to rotatably discharge pressurized fluid so as to form a revolving boring stream.

Yet another object of the present invention is to provide an aerator device adapted to perform a variety of tasks that would typically be completed by multiple devices, including aerating, dethatching, watering, fertilizing, and digging.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
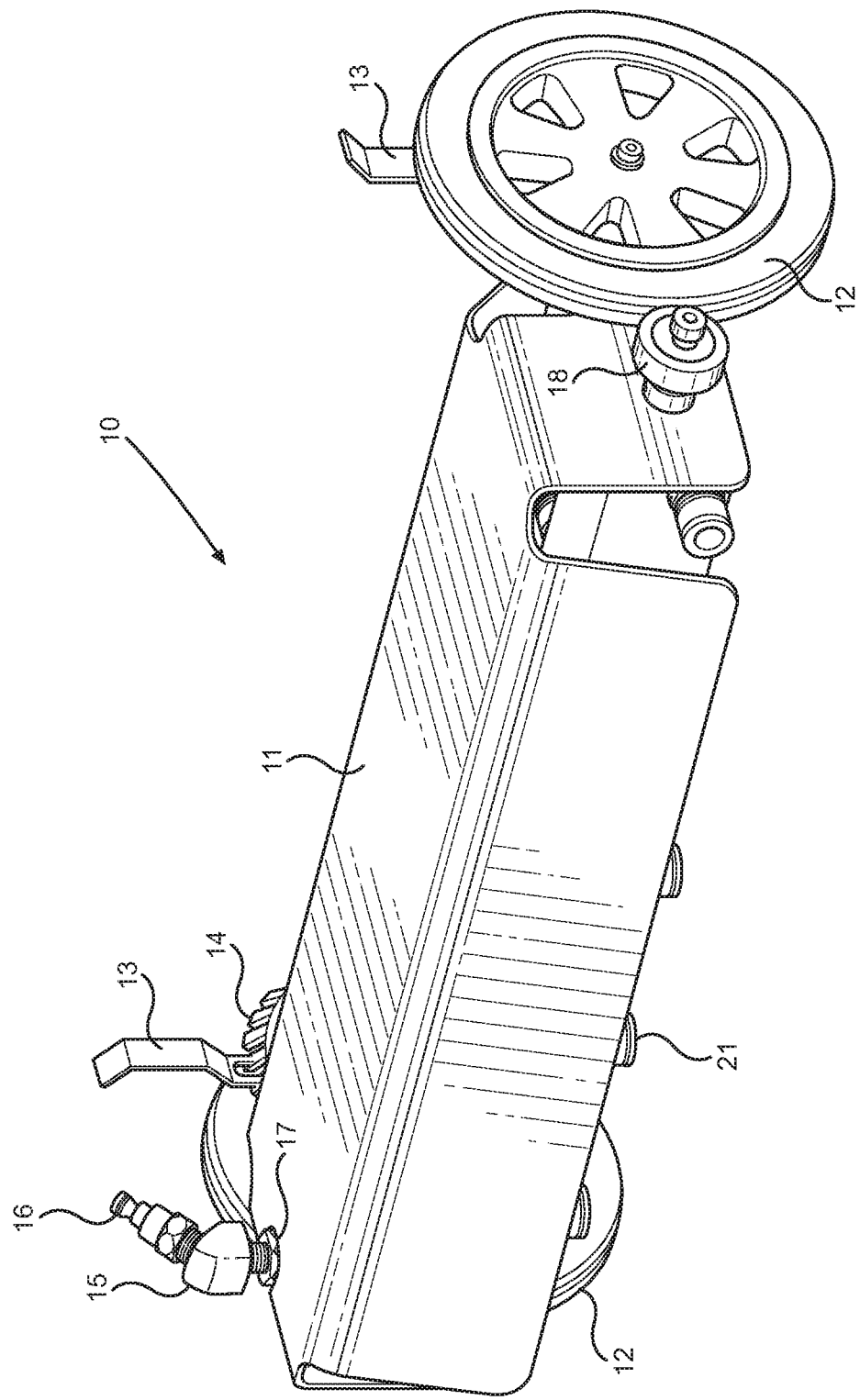
FIG. 1 shows a perspective view of one embodiment of the aerator device.

Reference is made herein to the attached drawings. Like reference numerals are used throughout the drawings to depict like or similar elements of the aerator device. For the purposes of presenting a brief and clear description of the present invention, the preferred embodiment will be discussed as used for boring aeration or planting holes in a ground surface using a pressurized fluid stream. The figures are intended for representative purposes only and should not be considered to be limiting in any respect.

Figure 2:
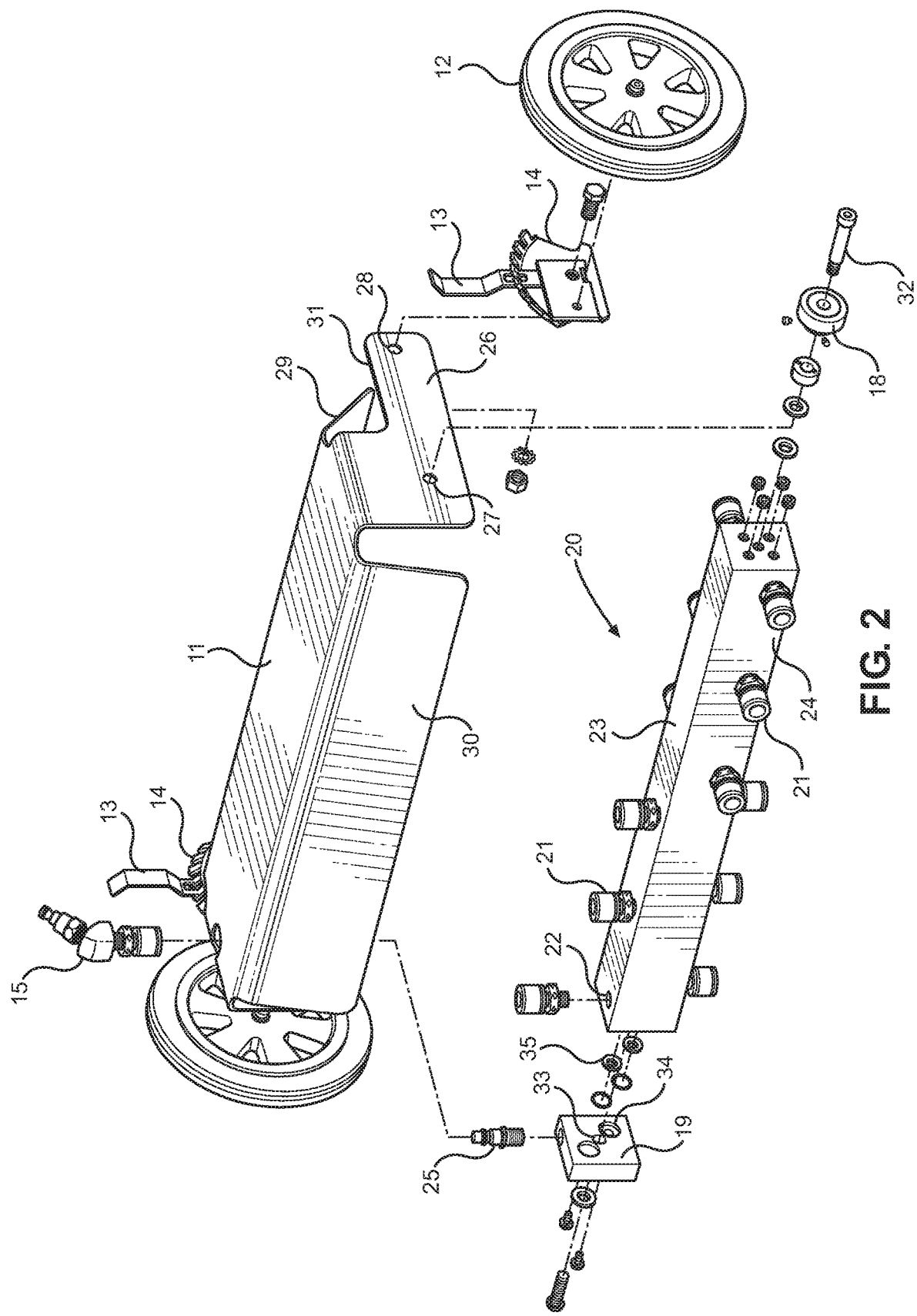
FIG. 2 shows an exploded view of one embodiment of the aerator device.

Referring now to FIGS. 1 and 2, there is shown a perspective view of one embodiment of the aerator device and an exploded view of one embodiment of the aerator device, respectively. The aerator device 10 includes a manifold 20 including a plurality of nozzle apertures 22, a connector aperture, and an interior channel in fluid communication with the connector aperture and the nozzle apertures 22. Some embodiments of the present invention can include multiple interior channels. For example, a single interior channel can be in fluid communication with each nozzle aperture 22, or each nozzle aperture 22 may be in fluid communication with a corresponding interior channel that branches from a main channel. In the shown embodiment, the manifold 20 is a rectangular prism, but can have alternate shapes in alternate embodiments, such as cylindrical. A cover plate 11 is fixedly disposed above the manifold 20. The cover plate 11 protects the manifold 20 and other components of the device, and further prevents fluid or debris from being splashed about during the aeration process.

A supply connector 15 extends upwardly from the cover plate 11 and is in fluid communication with a manifold connector 25 configured to transport fluid from a pressurized fluid source to the interior channel of the manifold 20. In the shown embodiment, the supply connector 15 includes a forty five degree rearward bend for facilitating a connection with a pressurized fluid supply, such as, for example, a fluid pressure washer tank. In the shown embodiment, the manifold connector 25 connects to an end cap 34 having its own interior channel. The end cap 34 is disposed adjacent one end of the manifold 20 and includes an outlet 34 in fluid communication with the interior channel of the manifold 20, such that fluid is transported from the source to the supply connector 15, through the manifold connector 25, through the interior channel of the end cap 34, into the interior channel of the manifold, and out of the plurality of nozzles 21. In an alternate embodiment, the manifold connector 25 may be affixed directly to the manifold 20. In the shown embodiment, the manifold connector 25 is a male quick-disconnect connector to allow for easy assembly of the device. However, alternate suitable connectors may be utilized.

A pair of wheels 12 are included for supporting the device 10 along a ground surface. A wheel height adjustment mechanism includes a frame 14 including a plurality of teeth that is affixed to a side portion 26 of the cover plate 11. A lever plate 13 is pivotally affixed to the frame 14, and a wheel 12 is rotatably coupled to the lever plate 13. The lever plate 13 is biased against the frame 14 so that the wheels 12 can maintain a desired height with respect to the ground. The lever plate 13 can be selectively disengaged from the frame 14 and pivoted to adjust the wheels 12 to a desired height.

In the illustrated embodiment, the manifold 20 is configured to rotate when the wheels 12 rotate. This is accomplished via a drive mechanism, such as a drive roller 18 coupled to an end of the manifold via a shaft fastener 32. The drive roller 18 is disposed on a front end 27 of one side portion 26 of the cover plate 11, while the wheel is disposed on a rearward extending end 31 of the same side portion 26 of the cover plate 11, which is the side portion 26 opposing the end cap 19. The drive roller 18 contacts the wheel 12, such that rotation of the wheel 12 causes rotation of the drive roller 18, which in turn causes rotation of the manifold 20. The end cap includes a recessed portion 34 including one or more bearings 35 that facilitate rotation of the manifold 20 with respect to the end cap 19.

In the illustrated embodiment, the nozzles 21 are arranged such that alternating rows of aeration holes are created when the manifold 20 rotates. A first grouping of nozzles 21 are disposed on a first pair of opposing faces 23 of the manifold 20. A second grouping of nozzles 21 are disposed on a second pair of opposing faces 24 of the manifold 20, such that the first grouping of nozzles 21 are oriented perpendicular to the second grouping of nozzles 21. This allows staggered rows of aeration holes to be created as the device 10 moves along a ground surface.

Figure 3:
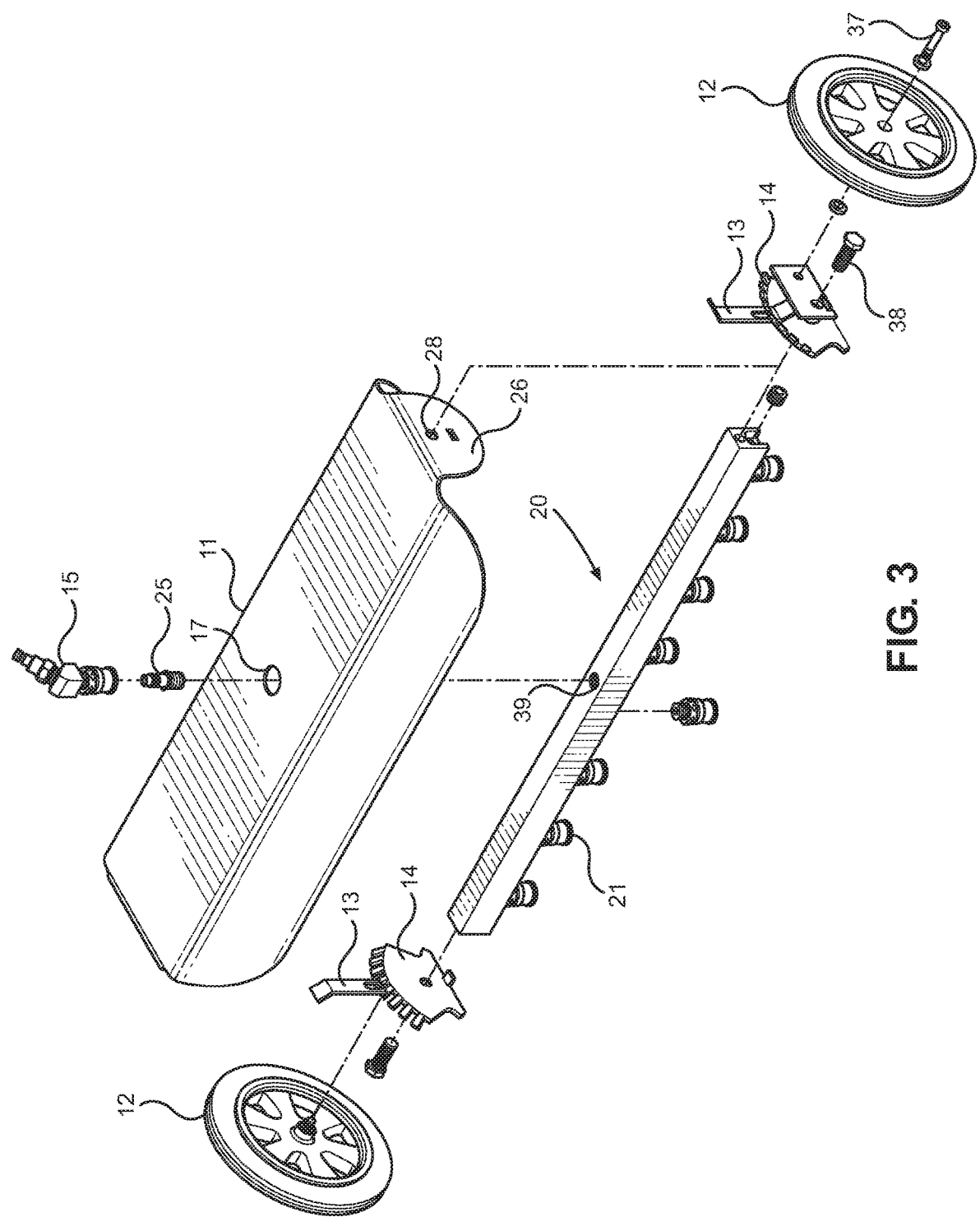
FIG. 3 shows an exploded view of an alternate embodiment of the aerator device.

Referring now to FIG. 3, there is shown an exploded view of an alternate embodiment of the aerator device. In the shown embodiment, the manifold 20 is static and does not rotate when the wheels 12 rotate. The manifold connector 25 connects directly to an aperture 39 disposed on the manifold 20, which is in fluid communication with the interior channel of the manifold 20. The nozzles 21 are disposed on a lower face of the manifold 20. In the shown embodiment, the nozzles 21 are spaced equally from one another on the manifold 20 to allow for evenly spaced aeration holes. In this embodiment, no drive roller is included, so the side portion 26 of the cover plate 11 may lack the rearward extending portion in order to reduce overall size and weight of the device. Further, the cover plate 11 is secured between the frame 14 of the wheel height mechanism and the manifold 20 via a fastener 38.

In all embodiments, the nozzles 21 are configured to discharge a stream of pressurized fluid. In some embodiments, the nozzles 21 include rotating nozzles that are configured to rotatably discharge a volume of pressurized fluid in so as to form a revolving stream. Different types of nozzles 21 are contemplated for use with the present invention, including both nozzles 21 having interior rotating components and nozzles 21 having exterior rotating components. Examples of different nozzles configured to discharge a revolving fluid stream can be found in U.S. patent application Ser. No. 15/856,873, which is incorporated herein by reference.

Figure 4:
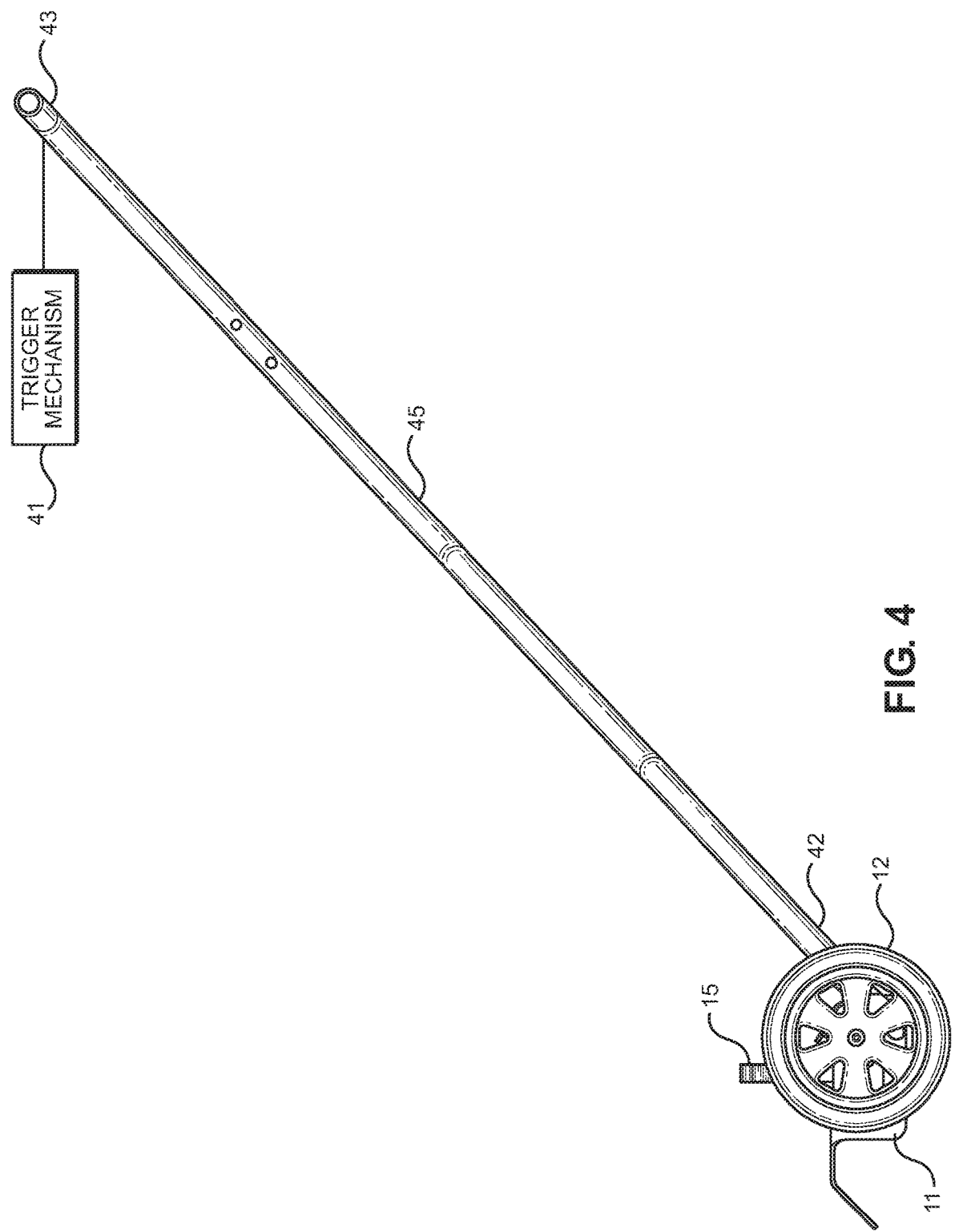
FIG. 4 shows a side view of one embodiment of the aerator device.

Referring now to FIG. 4, there is shown a side view of one embodiment of the aerator device. The aerator device further includes a handle 45 extending upwardly and rearwardly at an angle from the cover plate 11. In some embodiments, the handle 45 is pivotally secured to the cover plate 11, such that the height and angle of the handle 45 may be adjusted to optimize operator handling and comfort. In another embodiment, the lower end 42 of the handle is fixedly attached to the cover plate 11. Different types of handles 45 may be utilized, such as a T-shape handle, an A-shape handle, or the like. The handle 45 can have a single support and a crossbar centrally disposed at the upper end thereof, or may include a pair of supports connected to opposing ends of a crossbar. Additional handle members may be utilized to facilitate a comfortable grip when using the device.

The upper end 43 of the handle 45 includes a trigger mechanism 41. The trigger mechanism 41 is configured to be operably connected to a pressurized fluid source, such that activation of the trigger mechanism 41 causes fluid to flow from the pressurized fluid source. In one embodiment, the trigger mechanism 41 includes individual triggers operably connected to individual nozzles, such that activation of an individual trigger only causes fluid to discharge from its corresponding nozzles. In alternate embodiments, the trigger mechanism 41 includes a single trigger configured to cause simultaneous fluid discharge from all of the nozzles when activated.

In use, an operator may connect the supply connector 15 to a pressurized fluid source, such as a pressure washer tank, via a connecting hose or other type of connector configured to transport fluid therethrough. The trigger mechanism 41 can be activated to discharge a pressurized stream of fluid from one or more of the nozzles. In embodiments where the manifold rotates, the aerator can be pushed along the ground, forming staggered alternating rows of aeration holes. In embodiments where the manifold does not rotate, the operator may position the aerator as desired, activate the trigger mechanism to bore a single row of aeration holes, and deactivating the trigger mechanism. The operator can then move the aerator to a new location and repeat the process as often as desired. In instances where the pressurized fluid source provides water, the operator can use the device to bore pre-watered holes into the ground for planting various types of plants. The operator can utilize the device to easily aerate a ground surface, or to create holes for planting a variety of plants, via the selective discharge of pressurized fluid.

In addition to aeration, the present invention can be utilized to dethatch a lawn by moving the aerator device with the trigger mechanism activated. The pressurized fluid breaks up clumps of grass and other material, while the elongated holes act as a trough for water and grass seed to flow down in the soil, which can decrease the time it takes for grass to grow, and ensure that a healthy, full covering of grass is achieved. The pressurized fluid can include a fertilizing agent therein, so that aerating the soil with the present aerator device also introduces fertilizer to the soil. In this way, present invention provides an aerator device adapted to perform a variety of tasks that would typically be completed by multiple devices, including aerating, dethatching, watering, fertilizing, and digging.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An aerator device, comprising:
a manifold including an interior channel, a connector aperture, and a plurality of nozzle apertures;
a cover plate disposed on an upper side of the manifold;
a first connector including a first open end in fluid communication with the interior channel of the manifold and a second end extending through a connector aperture disposed on an upper side of the cover plate;
a second connector including a first end affixed to the second end of the first connector and a second end configured to receive a hose connection to a pressurized fluid supply;
a nozzle connected to each nozzle aperture of the plurality of nozzle apertures;
the length of each nozzle being less than a distance from the nozzle aperture to a ground surface;
a wheel height adjustment mechanism affixed to a side portion of the cover plate, the wheel height adjustment mechanism including a frame with a plurality of teeth, a lever plate pivotally connected to the frame, and a wheel rotatably connected to the lever plate, wherein the lever plate is configured to adjust the height of the wheel with respect to a ground surface;
wherein the first connector, second connector, manifold interior channel, and plurality of nozzles are in fluid communication with each other;
wherein the nozzle is configured to rotatably discharge a volume of pressurized fluid in so as to form a revolving stream.

2. The aerator device of claim 1, wherein each nozzle aperture of the plurality of nozzle apertures is spaced equally from one another.

3. The aerator device of claim 1, wherein the first connector is a quick-connect-style connector.

4. The aerator device of claim 1, wherein the second connector includes an angular bend in a range between forty-five and one hundred eighty degrees.

5. The aerator device of claim 1, wherein the lever plate is biased against the frame.

6. The aerator device of claim 1, further comprising a handle connected to the cover plate, the handle extending upwardly at an angle therefrom, wherein an upper end of the handle includes a trigger mechanism, wherein the trigger mechanism is configured to activate fluid flow from a pressurized fluid source.

7. The aerator device of claim 1, further comprising:
an end cap disposed on a first end of the manifold, the end cap including an aperture configured to receive the first open end of the first connector, an interior channel in fluid communication with the interior channel of the manifold, and one or more bearings configured to facilitate rotation of the manifold with respect to the end cap;
a drive roller coupled to a second end of the manifold and disposed on the side portion of the cover plate, the driver roller disposed on the wheel height adjustment mechanism and positioned such that an outer edge of the wheel contacts an outer edge of the driver roller, wherein rotation of the wheel is configured to cause rotation of the drive roller, which in turn is configured to cause rotation of the manifold.

8. The aerator device of claim 4, wherein the plurality of nozzle apertures includes a first group disposed on a first pair of opposing faces of the manifold, and a second group disposed on a second pair of opposing faces of the manifold.

9. The aerator device of claim 7, wherein the side portion of the cover plate includes a rearwardly extended section, wherein the wheel is disposed on the rearwardly extended section and the drive roller is positioned toward a front end of the cover plate.

10. The aerator device of claim 8, wherein the first grouping of nozzles are oriented perpendicular to the second grouping of nozzles.

11. The aerator device of claim 1, wherein the manifold further comprises a plurality of interior channels.

12. The aerator device of claim 11, wherein each of the plurality of interior channels is in fluid communication with a corresponding nozzle aperture, the plurality of interior channels further being in fluid communication with a main channel.

\* \* \* \* \*